United States Patent [19]

Willover

[11] 4,090,588
[45] May 23, 1978

[54] MEANS FOR LUBRICATING MACHINE COMPONENTS

[75] Inventor: Larry Neil Willover, Painted Post, N.Y.

[73] Assignee: Ingersoll-Rand Company, Woodcliff Lake, N.J.

[21] Appl. No.: 724,319

[22] Filed: Sep. 17, 1976

[51] Int. Cl.² .............................................. F01M 9/06
[52] U.S. Cl. ................................... 184/11 A; 308/127
[58] Field of Search ................ 184/11 A, 11 R, 11 B, 184/13 R, 6.12; 74/467; 308/127, 131

[56] References Cited

U.S. PATENT DOCUMENTS

| 1,096,924 | 5/1914 | Krebs | 184/11 R |
| 1,220,810 | 3/1917 | Alguist | 74/467 X |
| 1,375,376 | 4/1921 | Fynn | 184/11 R |
| 1,917,969 | 7/1933 | Hague | 308/127 |
| 2,258,077 | 10/1941 | Taylor | 184/6.12 |
| 2,555,003 | 5/1951 | Rhoads | 184/11 R |
| 2,606,796 | 8/1952 | Helms | 308/127 X |
| 2,996,148 | 8/1961 | Behnke et al. | 184/11 R |
| 3,383,937 | 5/1968 | Toenne et al. | 184/11 R X |
| 3,529,698 | 9/1970 | Nelson | 184/11 A X |

FOREIGN PATENT DOCUMENTS

| 274,056 | 3/1951 | Switzerland | 184/11 R |
| 304,496 | 1/1955 | Switzerland | 184/11 R |

Primary Examiner—David H. Brown
Attorney, Agent, or Firm—Bernard J. Murphy

[57] ABSTRACT

The invention comprises a lubricant trough or reservoir which is replaceably secured to an inner wall of a machine in an area where the reservoir will intercept, and reclaim, lubricant thrown by a rotating lubricant slinger-disc, or thrown by meshing gears, and discharge the reclaimed lubricant to bearings which carry a rotating shaft. The reservoir is open-topped, to admit the thrown lubricant, and has conduits extending therefrom which terminate in adjacency to bearings to be lubricated. The lubricant-discharging ends of the conduits are slightly elevated, relative to orifices in the reservoir from whence the conduits are supplied with lubricant, in order that the conduits will always retain therein a head or supply of lubricant immediately releasable therefrom upon any small quantity of lubricant being added to the reservoir.

12 Claims, 3 Drawing Figures

MEANS FOR LUBRICATING MACHINE COMPONENTS

This invention pertains to lubrication systems, and in particular to improved means for lubricating components of a machine, such as bearings, without having to employ pumps and the like.

It is, of course, necessary to provide a lubricant to the bearings of a machine rotary shaft to reduce friction as the bearings turn. As the shaft and bearing speeds increase, the rate at which lubrication is needed also increases and, typically, oil pumps are used to assure that the lubricant is adequately supplied to the bearings. However, any pump system adds expense to the machine assembly. Too, pumps driven by the machine may have to build pressure to force lubricant into the bearings. During the first few critical revolutions upon start-up, only marginal amounts of lubricant reach the bearings. This is also true of splash lubrication systems. They provide little or no lubricant at start-up, and only increase lubricant supply to the bearings as start-up speed increases to full running speed. These types of systems do not retain a supply of lubricant immediately releasable at the required point of lubrication.

It is an object of this invention to set forth improved means for lubricating machine components, means which avoid the disadvantages, of prior art systems, such as those noted in the foregoing.

Particularly, it is an object of this invention to disclose a means for lubricating machine components, comprising a lubricant reservoir; said reservoir having an open-top and a lubricant outlet, said outlet opening onto a first plane; rigid conduit means coupled at one end thereof to said outlet, and opening onto a second plane spaced apart from said first plane; and lubricant collector means coupled to said top for directing lubricant into said reservoir.

Further objects of this invention, as well as the novel features thereof, will become more apparent by reference to the following description, taken in conjunction with the accompanying figures, in which.

Figure 1:
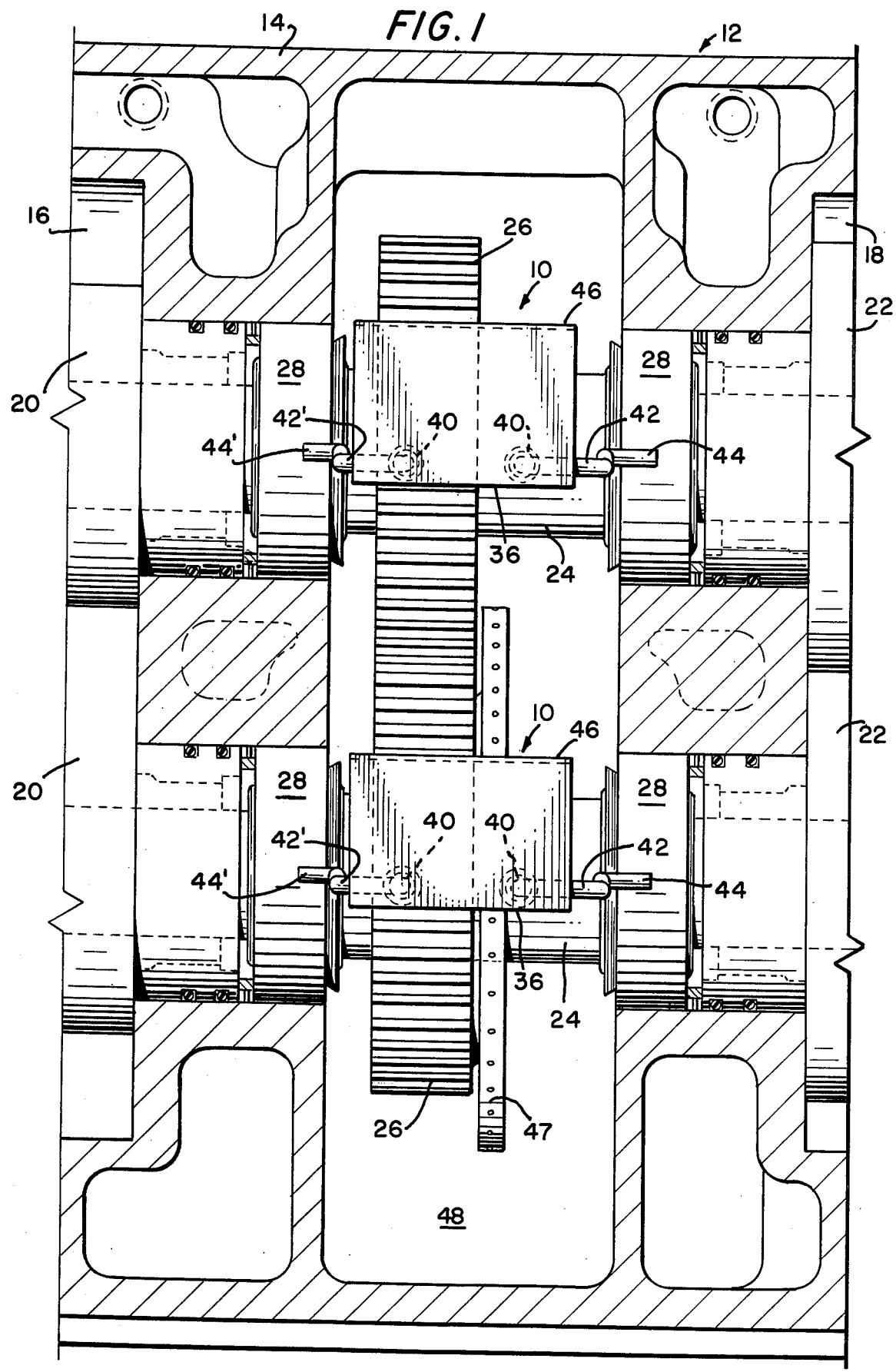
FIG. 1 is a cross-sectional view, in elevation, of a portion of a machine (i.e., a rotary, positive-displacement gas compressor) showing an embodiment of the invention in place therein.

Only by way of example, the novel lubricating means 10, in an embodiment thereof, is shown in FIG. 1 in use with a rotary, positive-displacement gas compressor 12. It will be readily understood that the means 10 has a universal adaptability to all types of machines.

The compressor 12 comprises a housing 14 with compression chambers 16 and 18 in which rotors (i.e., rotary pistons) 20 and 22 work to stage-compress gas. The rotors are carried on shafts 24 which are driven by meshing gears 26, and the shafts, in turn, are supported in bearings 28.

The wall of the compressor 12 which would be in the foreground is not shown, of course, as FIG. 1 is a cross-sectional view. However, the lubricating means 10 which is replaceably supported by the forward wall is shown; in fact, two of the means 10 are shown, one above the other, in the relative positioning which they assume on the forward wall.

Figure 2:
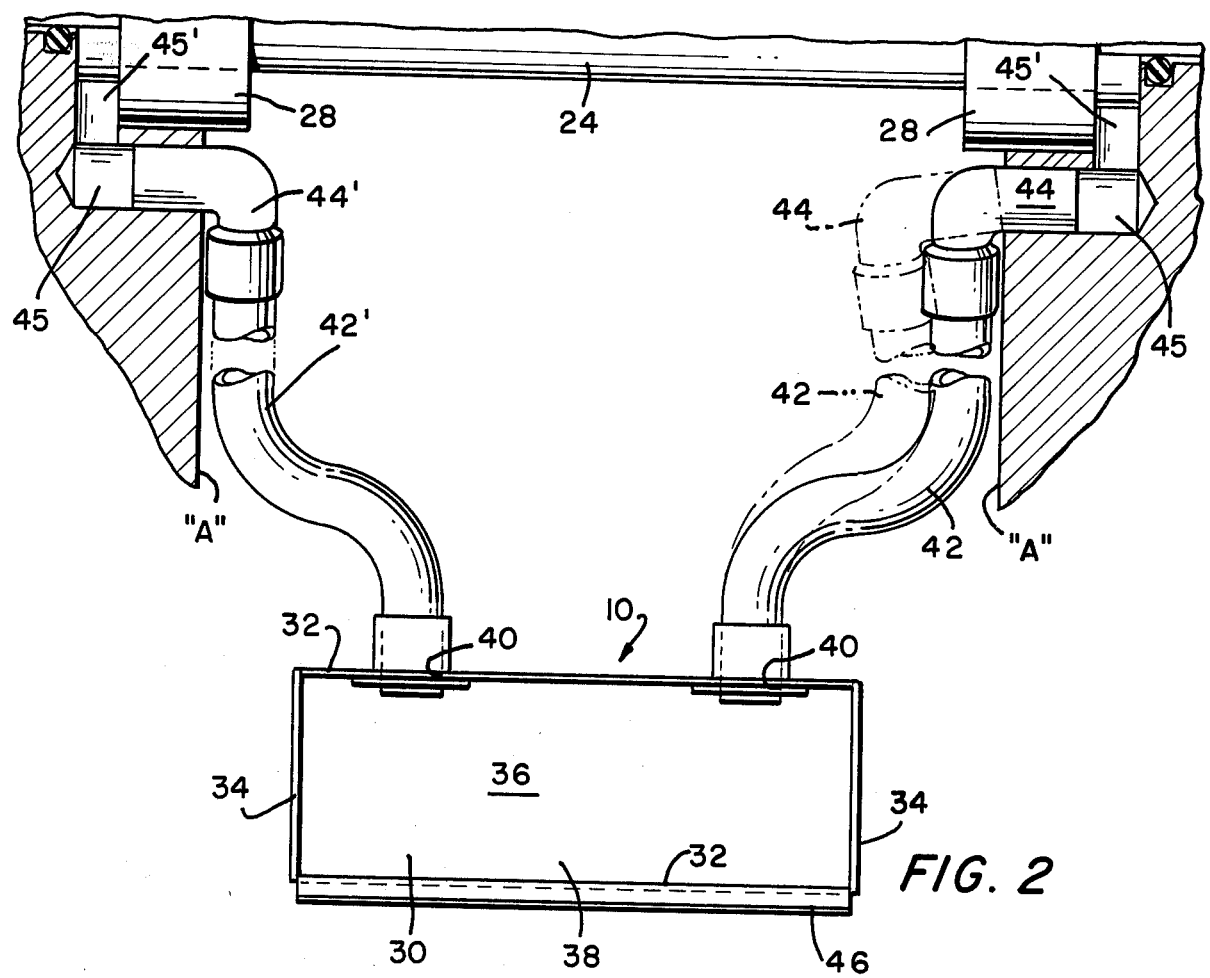
FIG. 2 is a plan view of the FIG. 1 embodiment of the novel lubricating means, the view being enlarged to approximately twice the scale of FIG. 1.
Figure 3:
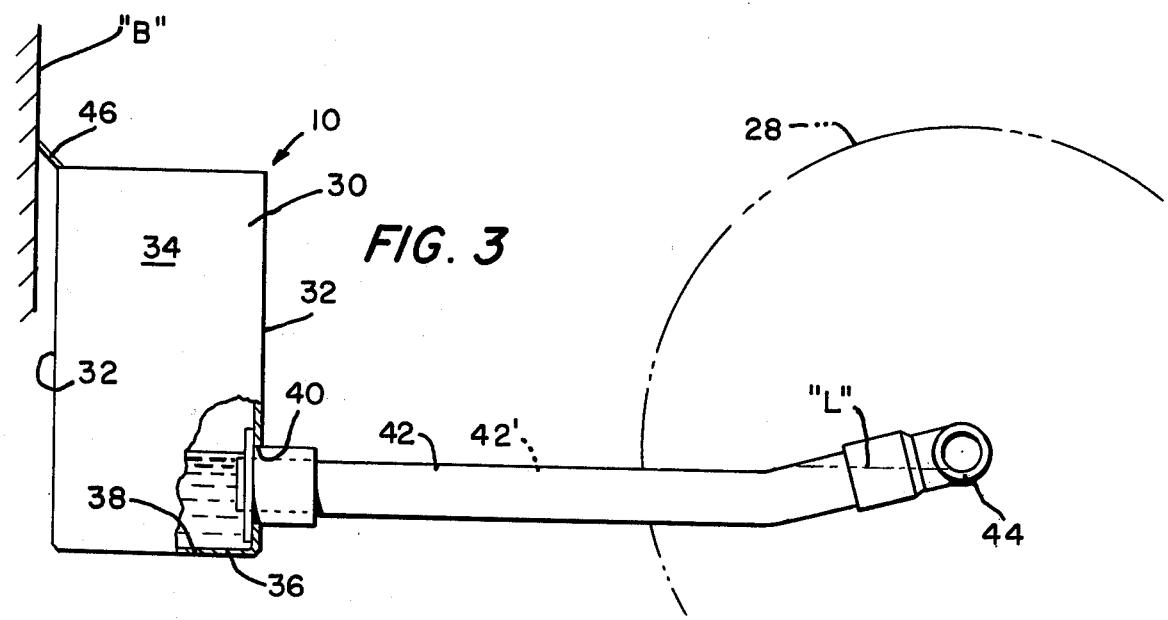
FIG. 3 is an end, elevational view of the means of FIGS. 1 and 2, being of the same scale as FIG. 2.

Each of the means 10, as shown in FIGS. 1-3, comprises a trough or reservoir 30 in which to confine lubricant. The reservoir is formed of vertical walls 32 and 34 which are joined at the bottom by a sump plate 36, the top of the reservoir being open. The sump plate 36 defines an inner bottom surface 38 of the reservoir which lies in a plane below the outlet openings 40 of the reservoir 30. A pair of conduits 42 and 42' are fixed to the openings 40 and extend therefrom into the compressor 12 for lubricating the bearings 28. Outermost terminations 44 and 44' of the conduits are disposed in locating bores 45 in immediate adjacency to the bearings 28. Bores 45 communicate with connecting bores 45' which open onto the rear of the bearings 28. A collector-flange 46 angularly disposed toward the supporting, forward wall for engagement therewith, collects and reclaims in the reservoir 30 such lubricant as streams down the face of the wall.

The conduits 42 (and 42', obscured) as seen in FIG. 3, extend for most of their lengths in a plane normal to that wall 32 in which are formed the openings 40. However, a terminal portion thereof is slightly raised from the normal plane, to dispose the terminations 44 (and 44') slightly elevated relative to openings 40. By this novel arrangement, most of the volume of each conduit 42 (and 42') retains a head or supply of lubricant therein immediately releasable therefrom, to lubricate the bearings 28, upon a first minute quantity of lubricant being added to the reservoir 30. The level of conduit-retained lubricant is designated by the index "L" in FIG. 3.

Immediately on start-up of the compressor 12, a slinger-disc 47 carried by the lowermost gear 26 picks up lubricant from sump 48 and throws the same, centrifugally, in all directions tangential to the gear. The thrown lubricant lubricates both gears 26, and great quantities thereof loft into the open top of the reservoir 30 and impinge on the inner walls of the housing 14. As soon as any minute quantity of lubricant is added to the level "L", lubricant is discharged via terminations 44 and 44' to bathe and lubricate the bearings 28.

To trap particulate matter, metal chips, etc., openings 40 and conduits 42 and 42' communicate with the inner volume of the reservoir 30 above the bottom surface 38. Thus, the volume-portion of reservoir 30 which lies below openings 40 serves as a separator.

In broken outline, in FIG. 2, conduit 42 is shown displaced inwardly. this is done to depict the method of installation of the novel lubricating means 10, as embodied herein. Very simply, the installer draws both conduits 42 and 42' together, and slides them along the walls "A" (and the reservoir 30 along wall "B"; FIG. 3) until the conduits reach, and are aligned with, the locating bores 45. Upon release of the conduits, they spread and nest in the bores 45. Accordingly, with the collector-flange 46 in engagement with the wall "B", and terminations 44 and 44' "latched" in the bores 45, the lubricating means 10 is secured in an optimum and operative location, while it is readily and easily replaceable therefrom.

Some of the novel features and benefits of the invention are as follows:

1. The invention provides a positive method of applying a lubricating fluid, by gravity, directly to bearings without mechanical, lubricant-pressurizing devices.

2. Initially, when lubricant is first added to the machine, lubricant is immediately transferred directly to the bearings for pre-lubrication before the machine starts and turns the bearings.

3. The invention provides a method of lubricating more than one bearing at a time, and each thereof with equal efficiency.

4. Initially, when lubricant is first added to the machine, it is applied to each bearing in such a manner as to ensure a flow of lubricant through the bearing, and further serves to clean the bearing.

5. The invention provides a means of lubricating bearings installed in different planes above the base line of the machine.

6. The invention retains a quantity of lubricant (after priming) immediately and releasably adjacent to the bearings, and assures that any added lubricant will force an equal amount out to lubricate the bearings.

7. The invention comprises a lubricant reservoir designed so that it acts as a separator for foreign particles such as metal chips, dirt, etc. (which are carried by the lubricant).

8. The novel lubricant reservoir is open at the top to catch lubricant splashed from the rotating shaft, gears, and lubricant slinger-disc; further, the reservoir is flanged at the top to reclaim lubricant which streams down the side wall of the machine.

9. Under operational evaluation, it has been established that the invention captures and places lubricant at the bearing before one complete revolution of the machine upon start-up.

While I have described my invention in connection with a specific embodiment thereof it is to be clearly understood that this is done only by way of example and not as a limitation to the scope of my invention as set forth in the objects thereof and in the appended claims.

I claim:

1. Means for lubricating machine components, comprising:
   a lubricant reservoir;
   said reservoir having an open-top and a lubricant outlet, said outlet opening onto a first plane;
   rigid conduit means coupled at one end thereof to said outlet, and opening onto a second plane spaced apart from said first plane; and
   lubricant collector means coupled to said top for directing lubricant into said reservoir; wherein
   said reservoir has inner walls joined to an inner bottom surface, in which to confine lubricant, said bottom surface defining a lowermost given level of said reservoir;
   said outlet comprises an opening formed in said reservoir, opening inwardly onto one of said walls, and outwardly of said reservoir;
   said conduit means is coupled to said opening and has a lubricant discharge means formed in an end thereof opposite said one end;
   said discharge means is disposed in a level elevated from said given level; and
   said opening is disposed in a level intermediate said given and elevated levels.

2. Means for lubricating machine components, according to claim 1, wherein:
   said discharge means extends parallel to said one wall.

3. Means for lubricating machine components, according to claim 1, wherein:
   said one wall is disposed in said one plane; and
   said conduit means extends from said one wall in a plane normal to said one plane.

4. Means for lubricating machine components, according to claim 3, wherein:
   said conduit means has a portion thereof angularly directed from said normal plane disposing said discharge means in elevation relative to said normal plane.

5. Means for lubricating machine components, according to claim 3, wherein:
   said conduit means has a portion thereof formed with serpentine bends or curvatures along said normal plane.

6. Means for lubricating machine components, according to claim 5, wheren:
   said conduit means comprises a plurality of conduits;
   said reservoir has a plurality of lubricant outlets spaced apart, one from another thereof, a given distance;
   each lubricant outlet of said plurality thereof has a conduit, of said plurality thereof, coupled thereto; and
   two conduits of said plurality each have a first bend or curvature, along said normal plane, which first bends of curvatures dispose portions of said two conduits in a juxtaposition with a distance therebetween which is greater than said given distance.

7. Means for lubricating machine components, according to claim 4, wherein:
   said conduit means, together with said reservoir, defines a chamber for maintaning a constant supply of lubricant therein, said chamber being bounded by said bottom surface, and said inner walls, and a first section of said angularly directed portion.

8. Means for lubricating machine components, according to claim 7, wherein:
   a second section of said angularly directed portion maintains said discharge means in elevation above said chamber.

9. Means for lubricating machine components, according to claim 7, wherein:
   said lubricant collector means comprises an elongate, narrow planar element integral with said top, and angularly disposed in a direction away from said first plane, for receiving lubricant thereon and conducting same into said reservoir.

10. Means for lubricating machine components, according to claim 9, in combination with a rotary machine, further including:
    a machine housing having side walls and a lubricant sump;
    a shaft rotatively disposed in said housing above said sump; and
    bearing means fixed in said housing rotatively supporting said shaft; wherein
    said reservoir is disposed upon one of said walls, and said lubricant collector means is in contacting engagement with said one wall.

11. Means for lubricating machine components, according to claim 10, wherein:
    said conduit means opens into said housing in immediate adjacency to said bearing means.

12. Means for lubricating machine components, according to claim 11, further including:
    means rotatively carried by said shaft, and intruding into said sump, for impelling lubricant from said sump into said reservoir.

* * * * *